(12) United States Patent
Perez et al.

(10) Patent No.: US 7,420,667 B2
(45) Date of Patent: Sep. 2, 2008

(54) EQUIPMENT FOR CAPTURING THE CONTOUR, MARKINGS, BORES, MILLINGS AND ETCHINGS OF AN OPHTHALMIC LENS OR TEMPLATE LENS FOR GLASSES

(75) Inventors: Veronica Marquez Perez, Barcelona (ES); Sergio Fructuoso Gonzalez, Barcelona (ES); Sergio Lopez Requejo, Barcelona (ES); Santiago Albert Sesena, Barcelona (ES)

(73) Assignee: Indo International SA, Barcelona (ES)

( * ) Notice: Subject to any disclaimer, the term of this patent is extended or adjusted under 35 U.S.C. 154(b) by 0 days.

(21) Appl. No.: 11/668,628

(22) Filed: Jan. 30, 2007

(65) Prior Publication Data
US 2007/0212992 A1 Sep. 13, 2007

(51) Int. Cl.
*G01B 9/00* (2006.01)
(52) U.S. Cl. ..................... 356/124; 356/239.1
(58) Field of Classification Search ......... 356/124–127, 356/239.1–239.3; 250/223 R, 223 B, 559.01; 382/141
See application file for complete search history.

(56) References Cited

U.S. PATENT DOCUMENTS

| 4,035,082 | A | * | 7/1977 | Kirschen ................... 356/364 |
| 4,102,575 | A | * | 7/1978 | Lapornik et al. ............ 356/125 |
| 5,500,732 | A | * | 3/1996 | Ebel et al. ................... 356/124 |
| 5,627,638 | A | * | 5/1997 | Vokhmin ..................... 356/124 |
| 5,812,254 | A | * | 9/1998 | Ebel et al. ................... 356/124 |
| 5,919,080 | A | * | 7/1999 | Savoie et al. .................. 451/5 |
| 6,788,399 | B2 | * | 9/2004 | Frumusa et al. ............. 356/124 |
| 7,256,881 | B2 | * | 8/2007 | Leppard et al. ............. 356/124 |
| 2004/0142642 | A1 | * | 7/2004 | Thepot et al. ................. 451/43 |

* cited by examiner

*Primary Examiner*—Sang Nguyen
(74) *Attorney, Agent, or Firm*—Mayer Brown LLP

(57) ABSTRACT

Equipment for capturing the contour, markings, bores, millings and etchings of an ophthalmic lens or a template lens for glasses. Equipment for capturing the contour, markings, bores, millings and etchings of an ophthalmic lens or a template lens for glasses comprising lighting means (11) that produce a beam of parallel rays of light that can produce a projection, image capturing linear means (15), a translucent support (3) arranged between lighting means (11) and capturing means (15), and control means that digitalize and process the projection obtaining a flat representation of the contour, markings, bores, millings and etchings. The lens or template lens are placed on translucent support (3) and a high quality projection of the lens or template lens is formed on support (3) without having to prepare the lens or template lens beforehand by painting it or the like.

20 Claims, 3 Drawing Sheets

EQUIPMENT FOR CAPTURING THE CONTOUR, MARKINGS, BORES, MILLINGS AND ETCHINGS OF AN OPHTHALMIC LENS OR TEMPLATE LENS FOR GLASSES

DESCRIPTION

1. Field of the Invention

The invention relates to an equipment for capturing the contour, markings, bores, millings and etchings of an ophthalmic lens or template lens for glasses.

2. State of the Art

Equipment for capturing the contour, markings, bores, millings and etchings of an ophthalmic lens or a template lens for glasses is known. In fact, this equipment is used, for example, in the case of glasses known as "lenses in the air" or "frameless lenses". These are glasses in which the lens are part of the frame: at one end of the lens, a part is attached which acts as a support for the temple, at the other end of the lens, a part is attached which configures the bridge of the glasses, which at the other end, has the other lens attached which, in turn, has another support attached for the other temple. The supports for the temple and the bridge are joined together only via the ophthalmic lenses. The join is usually via two holes drilled in the lens, in which pins from the support or the bridge are inserted. The optician usually has these glasses, which are mounted with ophthalmic lenses that are really only used as a support for the rest of the components, so that a possible client can try the glasses and appreciate their aesthetic effect. These lenses are called "template lenses" and do not have any type of prescription or ophthalmic correction, and are simply spherically curved parts. Their function, apart from acting as a support for the rest of the components, is to act as a template for the optician. In fact, when the optician wants to mount on the frame the ophthalmic lenses with the corrective prescription required by a particular client, he will use the template lens as a template for cutting the perimeter of the ophthalmic lens and positioning on said lens the holes into which the rest of the glasses elements will be mounted: the bridge and the supports for the temples.

Therefore, the optician must be able to determine the contour of the template lens, the position of the bores and/or millings, as well as the markings and etchings that may be included in the template lens and which are used to determine its geometrical position with respect to the user's eye.

Equipment exists that can capture this information, but the template lens needs to be prepared beforehand, for example by painting it and, furthermore, this equipment is not very accurate. This leads, for example, to a very cumbersome and inaccurate positioning of the holes, and gives the lens an unsatisfactory final appearance and, it can even cause the lenses to break as the holes are being turned.

DISCLOSURE OF THE INVENTION

The aim of the invention is to overcome these drawbacks. This purpose is achieved by means of equipment for capturing the contour, markings, bores, millings and etchings of an ophthalmic lens or of a template lens for glasses of the type indicated at the beginning, characterised in that it comprises:

lighting means suitable for producing a beam of parallel light rays that can produce a projection image capturing linear means a translucent support arranged between the lighting means and the image capturing linear means, with one front face, facing the lighting means and one rear face facing the image capturing linear means, where the front face is suitable for supporting the ophthalmic lens or template lens for glasses and receives the beam of parallel light rays that can produce a projection, so that when an ophthalmic lens, or a template lens for glasses is placed on the translucent support, a projection of the lens or template lens for glasses is formed on said translucent support, and control means suitable for digitalising the projection received by the image capturing linear means and for processing the projection obtaining a flat representation of the contour, markings, bores, millings and etchings.

In fact, the equipment according to the invention can produce a very accurate projection of an ophthalmic lens or a template lens for glasses, without the need to prepare the ophthalmic lens or template lens for glasses beforehand. The beam of parallel rays of light must be understood to be a beam of rays of light that are substantially parallel, in the sense that they can produce a projection that is perpendicular to the plane of the translucent support. In this way a projection is obtained of the contour, bores, millings and also the markings and/or etchings on the ophthalmic lens or on the template lens for glasses, which is very accurate, thus preventing parallax errors. Also sufficient contrast is obtained between the contour, bores, milling, markings and/or etchings and the rest of the lens without having to paint the lens or prepare it beforehand in any way. Therefore the optician's work is simplified and updated, since he only has to dismantle the template lens for glasses and place it on the translucent support.

Advantageously the equipment has a curvature measurement system for the lens or template lens. In fact, the template lens has a spherical curvature and the lens also has a substantially spherical one. With the value of this curvature and with the prior projection, it is possible to recalculate the spatial geometry of the lens or template lens. In other words, it is possible to position any point of the lens or template lens, in particular its bores, markings and etchings, precisely in a 3-D space. This means that it is possible to position these elements with even greater accuracy.

Preferably the curvature measurement system has communication means suitable for supplying the value of the curvature to the control means and, advantageously the control means include calculation means suitable for calculating the 3D shape of the lens, based on the flat projection and the curvatures provided by the curvature measurement system. In this way it is possible to automatically calculate the 3D shape of the lens or template lens for glasses and this data can be transmitted, for example, to a beveler for subsequently cutting or beveling a prescription lens with the necessary accuracy.

Preferably the lighting means comprise a spot light source (or which can be made up of various spot light emitters) and a collimator.

Advantageously the image capturing linear means comprise scanning speed and resolution adjustment means. In fact, the linear capturing means, such as for example scanners, have the virtue that they can increase their resolution according to the scanning speed. By having adjusting means for said scanning speed it is possible to modify the accuracy of the projection reading or scanning. This way the user can select a slower scanning speed when it is observed that the projection produced is of insufficient quality. Also the actual control means can decide to conduct a new scanning if they automatically detect errors when digitalising the image.

Preferably the translucent support is made up of a transparent sheet and a translucent sheet. In fact, the translucent support performs a double function: on the one hand it must form an appropriate projection so that the image capturing linear means can capture a high quality and high resolution image. For this reason it must be translucent. On the other hand it must act as a physical support for the lens that is placed on it. This physical support function only requires certain mechanical properties that allow it to support the handling and weight of the lens or template lens (apart from providing protection for the linear image capturing device). It can be envisaged that the translucent support be a single piece of translucent material. However, the image capturing linear means sold on the market usually have a transparent sheet as they are usually conceived to work as scanners, photocopiers, etc. In order to be able to use said image capturing linear means without the need to modify them (with the subsequent cost saving) it is advantageous to simply include a thin translucent sheet on one of the faces of the transparent sheet.

Advantageously the equipment comprises display means suitable for viewing the projection, the digitalised projection, the control instructions and the results. In fact, the display means enable the user to see the different stages performed by the equipment (the projection, the digitalisation of said projection, the mathematical processing, etc.) as well as any kind of control instruction that may be necessary in each stage, as well as the results obtained by the control means. Preferably it is a tactile screen that allows commands to be sent directly by touching it with a finger or an appropriate pointer.

Preferably the equipment comprises data and command input means.

BRIEF DESCRIPTION OF THE DRAWINGS

Other advantages and characteristics of the invention are appreciated from the following description, in which, as a non-limiting example, a preferred embodiment of the invention is described, with reference to the accompanying drawings, in which.

DETAILED DESCRIPTION OF AN EMBODIMENT OF THE INVENTION

Figure 1:
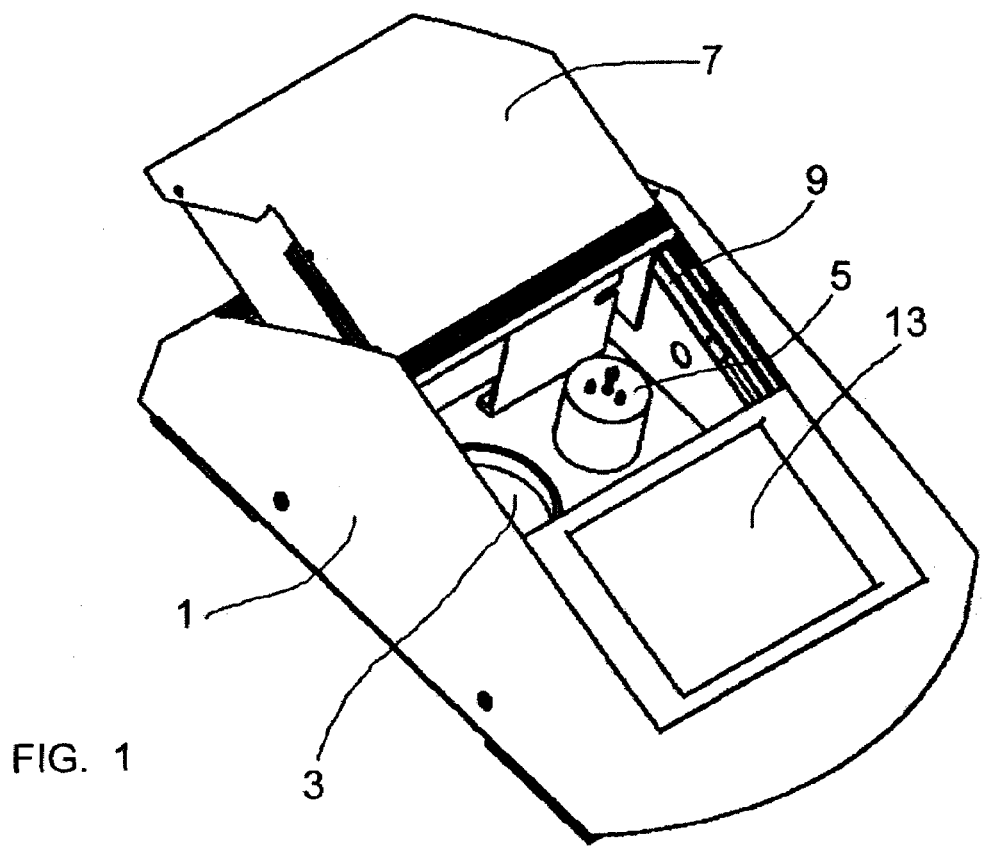
FIG. 1, a perspective view of equipment according to the invention, open.

FIG. 1 shows a perspective view of the equipment for capturing the contour, markings, bores, millings and etchings on an ophthalmic lens or a template lens for glasses. The equipment comprises a chassis or housing 1 inside which there is a translucent support 3 on which there is placed the ophthalmic lens or the template lens for glasses that it is intended to be projected. Next to the translucent support 3 there is a curvature measurement system 5. Housing 1 is closed by means of a lid 7 via guiding means 9 that allow lid 7 to slide between an open position, suitable for accessing inside housing 1 and handling the ophthalmic lens or template lens for glasses, and a closed position, suitable for projecting the ophthalmic lens or template lens for glasses. Therefore, lid 7 has on the bottom thereof lighting means 11 suitable for producing a beam of parallel rays of light that can produce an orthogonal projection on to translucent support 3. The equipment also has display means 13 through which it is possible to view the various stages performed by the equipment: the projection of the lens or template lens on to translucent support 3, the image once digitalized, as well as possible control instructions and/or results. To this end display means 13 comprise a tactile screen through which it is possible to view images and simultaneously give instructions or commands to the equipment control means. Also the tactile screen can be used as a data and command input means.

Figure 2:
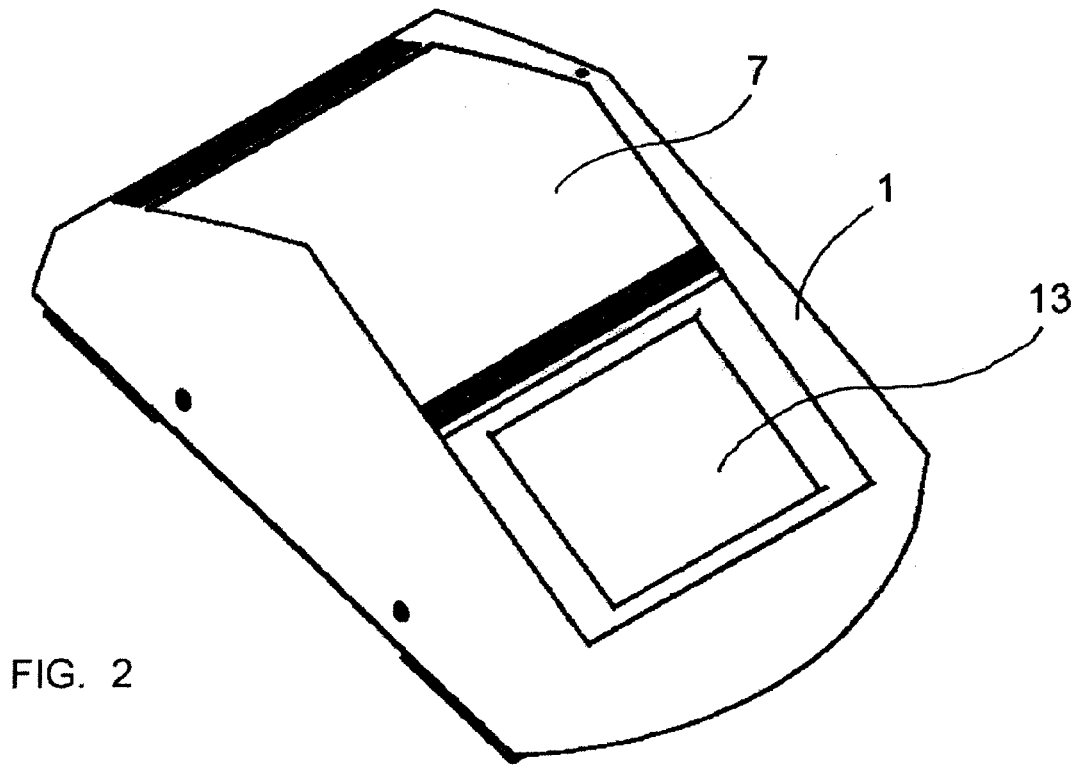
FIG. 2, a perspective view of the equipment in FIG. 1, closed.

FIG. 2 shows the equipment with lid 7 in a closed position. At this stage lighting means 11 are facing translucent support 3 and the internal space is darkened such that the surrounding light does not affect the projection.

Figure 3:
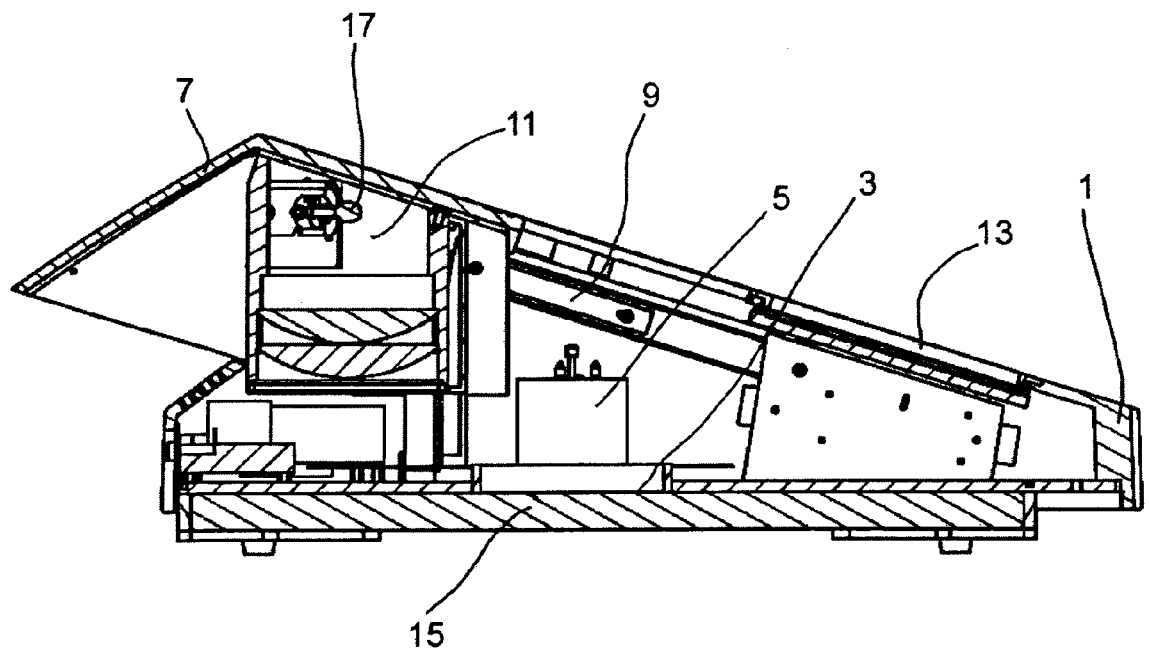
FIG. 3, a longitudinal section view of the equipment in FIG. 1, open.
Figure 4:
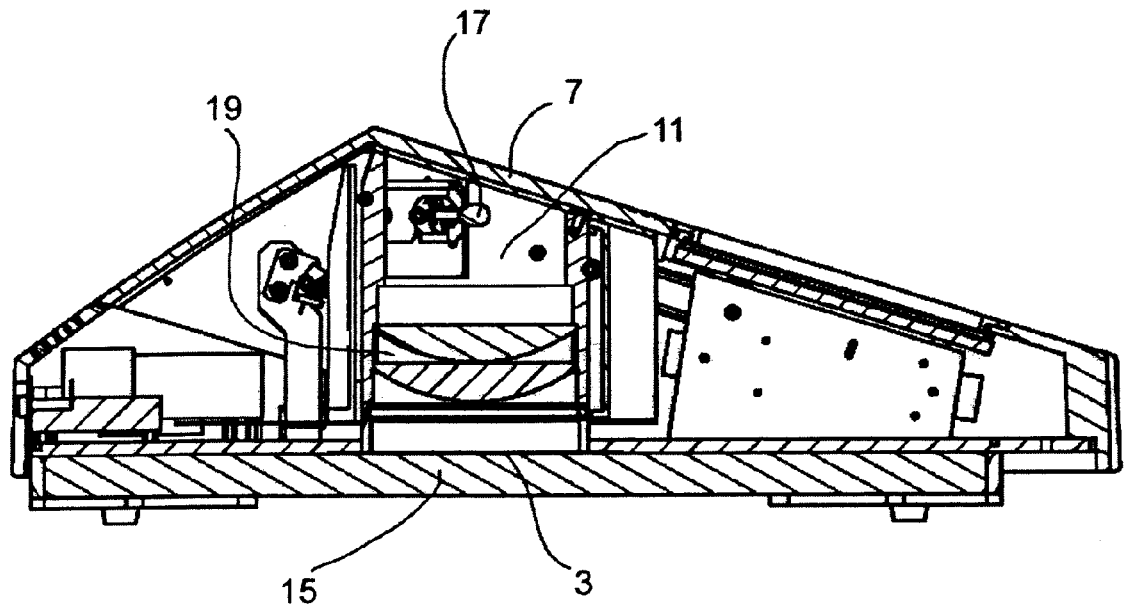
FIG. 4 a longitudinal section view of the equipment in FIG. 1, closed.

FIGS. 3 and 4 show a longitudinal section view of the equipment with lid 7 in open and closed position, respectively. It can be seen that underneath translucent support 3 image capturing linear means 15 are provided, the inside detail of which has not been shown since they are conventional type image capturing linear means, the detail of which is known to a person skilled in the art.

Figure 5:
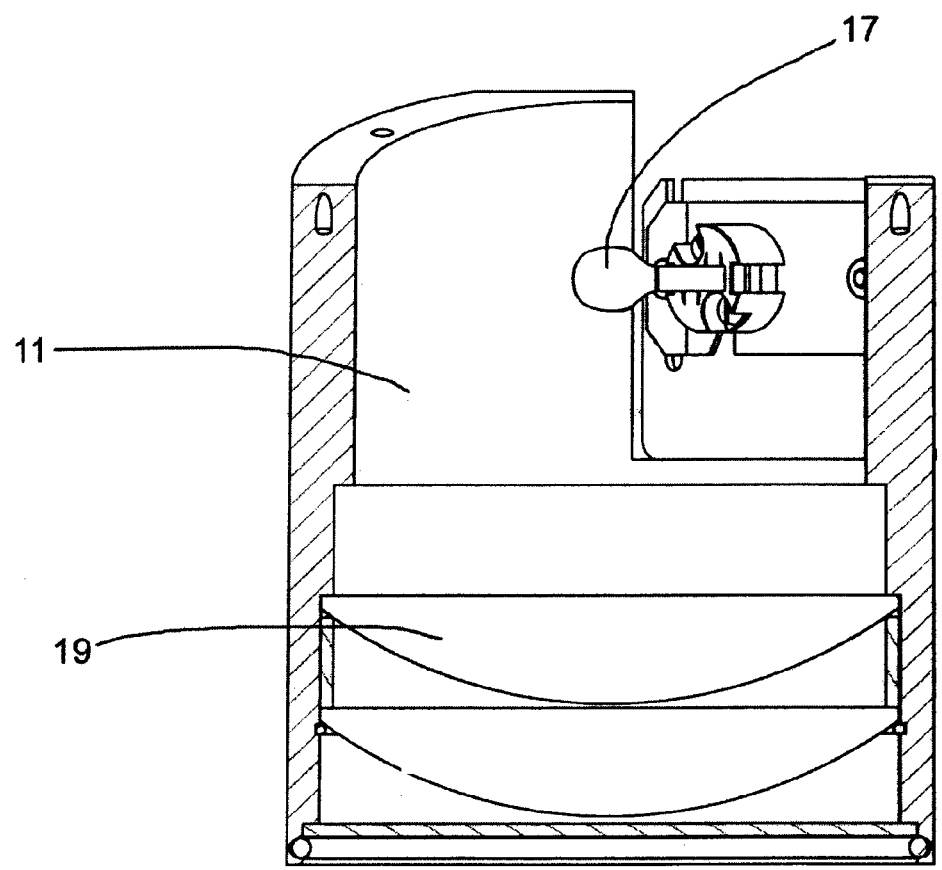
FIG. 5, an enlarged cross sectional view of the lighting means.

FIG. 5 shows an enlarged cross sectional view of lighting means 11. Basically they comprise a light source 17, which can be a spot light source such as, for example, a light bulb, and a collimator 19 that converts the beam of light from the light bulb into a beam of parallel rays of light. As already mentioned above it must be understood that the beam of light from collimator 19 has substantially parallel rays, in the sense that they are sufficiently parallel to produce a projection that is orthogonal to translucent support 3.

Figure 6:
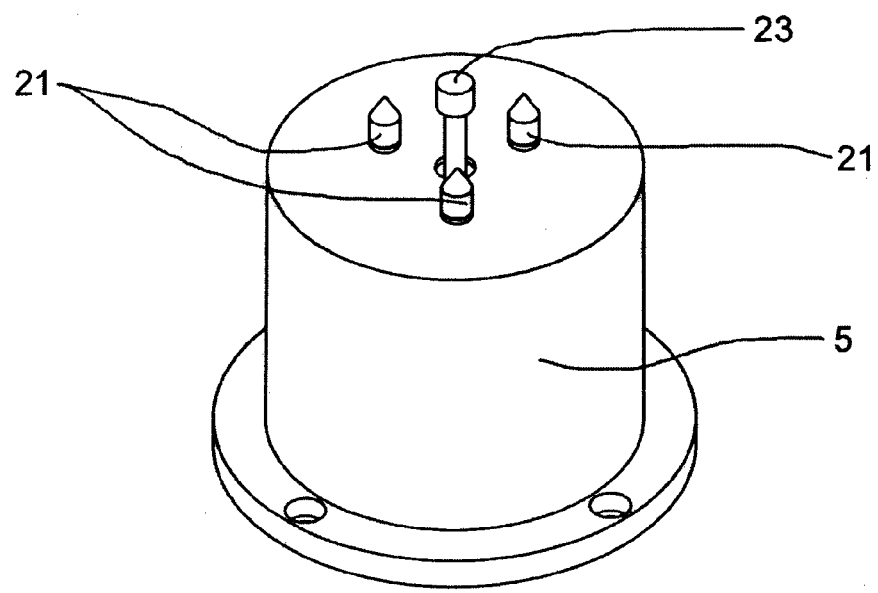
FIG. 6, a perspective view of a curvature measurement system.

FIG. 6 shows curvature measurement system 5. Basically it comprises three fixed support points 21 and a retractable pin 23. By supporting the lens or template lens on the three support points 21 retractable rod 23 comes into contact with the surface of the lens or of the template lens, thus determining the difference in height between retractable pin 23 and the three support points 21. Therefore it is possible to calculate the curvature of the lens or template lens, taking into account that they are spherical or quasi-spherical surfaces. The information obtained by the curvature measurement system 5 is sent to the control means that can comprise, for example, a micro-processor. Also, the control means can comprise calculation means suitable for obtaining the 3D shape of the lens or template lens including the spatial position of the contour, markings, bores, millings and/or etchings that it may present.

The invention claimed is:

1. Equipment for capturing the contour, markings, bores, millings and etchings of an ophthalmic lens for glasses wherein the ophthalmic lens is already in its final shape and characterized in that the equipment comprises:

lighting means (11) suitable for producing a beam of parallel rays of light that can produce a projection, image capturing linear means (15), a translucent support (3) arranged between said lighting means (11) and said image capturing linear means (15), with one front face, facing lighting means (11) and one rear face facing image capturing linear means (15), where said front face is suitable for supporting said ophthalmic lens for glasses and receiving said beam of parallel rays of light that can produce a projection, so that when an ophthalmic lens for glasses is placed on said translucent support (3) a projection of said lens for glasses is formed on said translucent support (3), and control means suitable for digitalizing said projection received by said image capturing linear means (15) and for processing said projection and obtaining a flat representation of said contour, markings, bores, milling or etchings.

2. Equipment according to claim 1, characterized in that it has a curvature measurement system (5) of said ophthalmic lens.

3. Equipment according to claim 2, characterized in that said curvature measurement system (5) has communication means suitable for supplying the value of said curvatures to said control means.

4. Equipment according to claim 1, characterized in that said control means have calculation means suitable for calculating the 3D shape of said lens on the basis of said projection and said curvatures.

5. Equipment according to claim 1, characterized in that said lighting means (11) comprise a spot light source (17) and a collimator.

6. Equipment according to claim 1, characterized in that said lighting means (11) comprise a light source (17) made up of various spot light emitters and a collimator (19).

7. Equipment according to claim 1, characterized in that said image capturing linear means (15) comprise scanning speed and resolution adjustment means.

8. Equipment according to claim 1, characterized in that said translucent support (3) is made up of a transparent sheet and a translucent sheet.

9. Equipment according to claim 1, characterized in that it comprises display means (13) suitable for viewing said projection, said digitalized projection, control instructions and results.

10. Equipment according to claim 1, characterized in that it comprises data and command input means.

11. Equipment for capturing the contour, markings, bores, millings and etchings of a template lens for glasses wherein the template lens is already in its final shape and characterized in that the equipment comprises:
    lighting means (11) suitable for producing a beam of parallel rays of light that can produce a projection,
    image capturing linear means (15),
    a translucent support (3) arranged between said lighting means (11) and said image capturing linear means (15), with one front face, facing lighting means (11) and one rear face facing image capturing linear means (15), where said front face is suitable for supporting said template lens for glasses and receiving said beam of parallel rays of light that can produce a projection, so that when a template lens for glasses is placed on said translucent support (3) a projection of said template lens for glasses is formed on said translucent support (3), and
    control means suitable for digitalizing said projection received by said image capturing linear means (15) and for processing said projection and obtaining a flat representation of said contour, markings, bores, milling or etchings.

12. Equipment according to claim 1, characterized in that it has a curvature measurement system (5) of said template lens.

13. Equipment according to claim 2, characterized in that said curvature measurement system (5) has communication means suitable for supplying the value of said curvatures to said control means.

14. Equipment according to claim 11, characterized in that said control means have calculation means suitable for calculating the 3D shape of said lens on the basis of said projection and said curvatures.

15. Equipment according to claim 11, characterized in that said lighting means (11) comprise a spot light source (17) and a collimator.

16. Equipment according to claim 11, characterized in that said lighting means (11) comprise a light source (17) made up of various spot light emitters and a collimator (19).

17. Equipment according to claims 11, characterized in that said image capturing linear means (15) comprise scanning speed and resolution adjustment means.

18. Equipment according to claim 11, characterized in that said translucent support (3) is made up of a transparent sheet and a translucent sheet.

19. Equipment according to claim 11, characterized in that it comprises display means (13) suitable for viewing said projection, said digitalized projection, control instructions and results.

20. Equipment according to claim 11, characterized in that it comprises data and command input means.

* * * * *